US008403045B2

(12) United States Patent
Brenneis et al.

(10) Patent No.: US 8,403,045 B2
(45) Date of Patent: Mar. 26, 2013

(54) SETTABLE COMPOSITIONS COMPRISING UNEXPANDED PERLITE AND METHODS OF CEMENTING IN SUBTERRANEAN FORMATIONS

(75) Inventors: Chad Brenneis, Marlow, OK (US); Jeffery Karcher, Duncan, OK (US); Craig W. Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 12/975,196

(22) Filed: Dec. 21, 2010

(65) Prior Publication Data

US 2011/0100626 A1 May 5, 2011

Related U.S. Application Data

(60) Continuation-in-part of application No. 12/821,412, filed on Jun. 23, 2010, now Pat. No. 8,307,899, which is a continuation-in-part of application No. 12/606,381, filed on Oct. 27, 2009, now Pat. No. 7,743,828, which is a continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*E21B 33/13* (2006.01)
*E21B 33/14* (2006.01)
*C04B 28/02* (2006.01)
*C04B 28/04* (2006.01)
*C09K 8/46* (2006.01)

(52) U.S. Cl. ........ 166/277; 106/698; 106/716; 106/751; 106/819; 166/292; 166/293; 166/300

(58) Field of Classification Search .................. None
See application file for complete search history.

(56) References Cited

U.S. PATENT DOCUMENTS

| | | | |
|---|---|---|---|
| 2,045,899 | A | 6/1936 | Davis |
| 2,094,316 | A | 9/1937 | Cross et al. |
| 2,193,775 | A | 3/1940 | Stratford |
| 2,193,807 | A | 3/1940 | Dieterich |
| 2,329,940 | A | 9/1943 | Ponzer |
| 2,772,739 | A | 12/1956 | Arie |
| 2,842,205 | A | 7/1958 | Allen et al. |
| 2,848,051 | A | 8/1958 | Willaims |
| 2,871,133 | A | 1/1959 | Palonen et al. |
| 2,880,096 | A | 3/1959 | Hurley |
| 2,945,769 | A | 7/1960 | Gama et al. |
| 3,066,031 | A | 11/1962 | Schifferle |
| 3,168,139 | A | 2/1965 | Kennedy et al. |
| 3,320,077 | A | 5/1967 | Prior |
| 3,407,193 | A | 10/1968 | McColl et al. |
| 3,454,095 | A | 7/1969 | Messenger et al. |
| 3,499,491 | A | 3/1970 | Wyant et al. |
| 3,557,876 | A | 1/1971 | Tragesser |
| 3,574,816 | A | 4/1971 | Abbdellatif et al. |
| 3,748,159 | A | 7/1973 | George |
| 3,876,005 | A | 4/1975 | Fincher et al. |
| 3,887,009 | A | 6/1975 | Miller et al. |
| 3,887,385 | A | 6/1975 | Quist et al. |
| 3,959,007 | A | 5/1976 | Pitt |
| 4,018,617 | A | 4/1977 | Nicholson |
| 4,018,619 | A | 4/1977 | Webster et al. |
| 4,031,184 | A | 6/1977 | McCord |
| 4,036,301 | A | 7/1977 | Powers et al. |
| 4,101,332 | A | 7/1978 | Nicholson |
| 4,105,459 | A | 8/1978 | Mehta |
| 4,176,720 | A | 12/1979 | Wilson |
| 4,268,316 | A | 5/1981 | Wills et al. |
| 4,274,881 | A | 6/1981 | Langton |
| 4,341,562 | A | 7/1982 | Ahlbeck |
| RE31,190 | E | 3/1983 | Detroit et al. |
| 4,407,677 | A | 10/1983 | Wills et al. |
| 4,432,800 | A | 2/1984 | Kneller et al. |
| 4,435,216 | A | 3/1984 | Diehl et al. |
| 4,436,850 | A | 3/1984 | Burdick et al. |
| 4,460,292 | A | 7/1984 | Durham et al. |
| 4,494,990 | A | 1/1985 | Harris |
| 4,515,635 | A | 5/1985 | Rao et al. |
| 4,519,452 | A | 5/1985 | Tsao et al. |
| 4,555,269 | A | 11/1985 | Rao et al. |
| 4,614,599 | A | 9/1986 | Walker |
| 4,624,711 | A | 11/1986 | Styron |
| 4,633,950 | A | 1/1987 | Delhommer et al. |
| 4,676,317 | A | 6/1987 | Fry et al. |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

U.S. Appl. No. 12/833,189, filed Jul. 9, 2010, Roddy et al.
U.S. Appl. No. 12/895,436, filed Sep. 30, 2010, Benkley.
U.S. Appl. No. 12/975,196, filed Dec. 21, 2010, Brenneis et al.
Bartlet-Gouedard, "A Non-Conventional Way of Developing Cement Slurry for Geothermal Wells", 2001.

(Continued)

*Primary Examiner* — George Suchfield
(74) *Attorney, Agent, or Firm* — Craig W. Roddy; Tumey L.L.P.

(57) ABSTRACT

An embodiment of the present invention comprises a method of cementing comprising: placing a settable composition into a well bore, the settable composition comprising unexpanded perlite, cement kiln dust, and water; and allowing the settable composition to set. Another embodiment of the present invention comprises a method of cementing comprising: placing a settable composition into a well bore, the settable composition comprising ground unexpanded perlite, Portland cement interground with pumicite, and water; and allowing the settable composition to set. Yet another embodiment of the present invention comprises a settable composition comprising: ground unexpanded perlite; cement kiln dust; and water.

35 Claims, No Drawings

U.S. PATENT DOCUMENTS

| | | | |
|---|---|---|---|
| 4,676,832 | A | 6/1987 | Childs et al. |
| 4,741,782 | A | 5/1988 | Styron |
| 4,784,223 | A | 11/1988 | Worrall et al. |
| 4,829,107 | A | 5/1989 | Kindt |
| 4,883,125 | A | 11/1989 | Wilson et al. |
| 4,941,536 | A | 7/1990 | Brothers et al. |
| 4,992,102 | A | 2/1991 | Barbour |
| 5,030,366 | A | 7/1991 | Wilson et al. |
| 5,049,288 | A | 9/1991 | Brothers et al. |
| 5,058,679 | A | 10/1991 | Hale et al. |
| RE33,747 | E | 11/1991 | Hartley et al. |
| 5,086,850 | A | 2/1992 | Harris et al. |
| 5,121,795 | A | 6/1992 | Ewert et al. |
| 5,123,487 | A | 6/1992 | Harris et al. |
| 5,125,455 | A | 6/1992 | Harris et al. |
| 5,127,473 | A | 7/1992 | Harris et al. |
| 5,183,505 | A | 2/1993 | Spinney |
| 5,213,160 | A | 5/1993 | Nahm et al. |
| 5,215,585 | A | 6/1993 | Luthra et al. |
| 5,238,064 | A | 8/1993 | Dahl et al. |
| 5,252,128 | A | 10/1993 | Gopalkrishnan |
| 5,266,111 | A | 11/1993 | Barbour |
| 5,295,543 | A | 3/1994 | Terry et al. |
| 5,305,831 | A | 4/1994 | Nahm |
| 5,314,022 | A | 5/1994 | Cowan et al. |
| 5,327,968 | A | 7/1994 | Onan et al. |
| 5,337,824 | A | 8/1994 | Cowan |
| 5,339,902 | A | 8/1994 | Harris |
| 5,346,548 | A | 9/1994 | Mehta |
| 5,352,288 | A | 10/1994 | Mallow |
| 5,358,044 | A | 10/1994 | Hale et al. |
| 5,358,049 | A | 10/1994 | Hale et al. |
| 5,361,841 | A | 11/1994 | Hale et al. |
| 5,361,842 | A | 11/1994 | Hale et al. |
| 5,368,103 | A | 11/1994 | Heathman et al. |
| 5,370,185 | A | 12/1994 | Cowan et al. |
| 5,372,641 | A | 12/1994 | Carpenter |
| 5,382,290 | A | 1/1995 | Nahm et al. |
| 5,383,521 | A | 1/1995 | Onan et al. |
| 5,383,967 | A | 1/1995 | Chase |
| 5,398,758 | A | 3/1995 | Onan et al. |
| 5,417,759 | A | 5/1995 | Huddleston |
| 5,423,379 | A | 6/1995 | Hale et al. |
| 5,430,235 | A | 7/1995 | Hooykaas et al. |
| 5,439,056 | A | 8/1995 | Cowan |
| 5,456,751 | A | 10/1995 | Zandi et al. |
| 5,458,195 | A | 10/1995 | Totten et al. |
| 5,464,060 | A | 11/1995 | Hale et al. |
| 5,472,051 | A | 12/1995 | Brothers |
| 5,476,144 | A | 12/1995 | Nahm et al. |
| 5,494,513 | A | 2/1996 | Fu et al. |
| 5,499,677 | A | 3/1996 | Cowan |
| 5,515,921 | A | 5/1996 | Cowan et al. |
| 5,518,996 | A | 5/1996 | Maroy et al. |
| 5,520,730 | A | 5/1996 | Barbour |
| 5,529,123 | A | 6/1996 | Carpenter et al. |
| 5,529,624 | A | 6/1996 | Riegler |
| 5,536,311 | A | 7/1996 | Rodrigues |
| 5,542,782 | A | 8/1996 | Carter et al. |
| 5,554,352 | A | 9/1996 | Jaques et al. |
| 5,569,324 | A | 10/1996 | Totten et al. |
| 5,580,379 | A | 12/1996 | Cowan |
| 5,585,333 | A | 12/1996 | Dahl et al. |
| 5,588,489 | A | 12/1996 | Chatterji et al. |
| 5,641,584 | A | 6/1997 | Andersen et al. |
| 5,673,753 | A | 10/1997 | Hale et al. |
| 5,688,844 | A | 11/1997 | Chatterji et al. |
| 5,711,383 | A | 1/1998 | Terry et al. |
| 5,716,910 | A | 2/1998 | Totten et al. |
| 5,728,654 | A | 3/1998 | Dobson et al. |
| 5,789,352 | A | 8/1998 | Carpenter |
| 5,795,924 | A | 8/1998 | Chatterji et al. |
| 5,820,670 | A | 10/1998 | Chatterji et al. |
| 5,851,960 | A | 12/1998 | Totten et al. |
| 5,866,516 | A | 2/1999 | Costin |
| 5,866,517 | A | 2/1999 | Carpenter et al. |
| 5,874,387 | A | 2/1999 | Carpenter et al. |
| 5,897,699 | A | 4/1999 | Chatterji et al. |
| 5,900,053 | A | 5/1999 | Brothers et al. |
| 5,913,364 | A | 6/1999 | Sweatman |
| 5,988,279 | A | 11/1999 | Udarbe et al. |
| 6,022,408 | A | 2/2000 | Stokes et al. |
| 6,060,434 | A | 5/2000 | Sweatman et al. |
| 6,060,535 | A | 5/2000 | Villar et al. |
| 6,063,738 | A | 5/2000 | Chatterji et al. |
| 6,098,711 | A | 8/2000 | Chatterji et al. |
| 6,138,759 | A | 10/2000 | Chatterji et al. |
| 6,143,069 | A | 11/2000 | Brothers et al. |
| 6,145,591 | A | 11/2000 | Boncan et al. |
| 6,153,562 | A | 11/2000 | Villar et al. |
| 6,167,967 | B1 | 1/2001 | Sweatman |
| 6,170,575 | B1 | 1/2001 | Reddy et al. |
| 6,230,804 | B1 | 5/2001 | Mueller et al. |
| 6,244,343 | B1 | 6/2001 | Brothers et al. |
| 6,245,142 | B1 | 6/2001 | Reddy et al. |
| 6,258,757 | B1 | 7/2001 | Sweatman et al. |
| 6,277,189 | B1 | 8/2001 | Chugh |
| 6,312,515 | B1 | 11/2001 | Barlet-Gouedard et al. |
| 6,315,042 | B1 | 11/2001 | Griffith et al. |
| 6,328,106 | B1 | 12/2001 | Griffith et al. |
| 6,332,921 | B1 | 12/2001 | Brothers et al. |
| 6,367,550 | B1 | 4/2002 | Chatterji et al. |
| 6,379,456 | B1 | 4/2002 | Heathman et al. |
| 6,402,833 | B1 | 6/2002 | O'Hearn et al. |
| 6,409,819 | B1 | 6/2002 | Ko |
| 6,451,104 | B2 | 9/2002 | Mehta |
| 6,457,524 | B1 | 10/2002 | Roddy |
| 6,478,869 | B2 | 11/2002 | Reddy et al. |
| 6,488,763 | B2 | 12/2002 | Brothers et al. |
| 6,488,764 | B2 | 12/2002 | Westerman |
| 6,494,951 | B1 | 12/2002 | Reddy et al. |
| 6,500,252 | B1 | 12/2002 | Chatterji et al. |
| 6,508,305 | B1 | 1/2003 | Brannon et al. |
| 6,516,884 | B1 | 2/2003 | Chatterji et al. |
| 6,524,384 | B2 | 2/2003 | Griffith et al. |
| 6,547,871 | B2 | 4/2003 | Chatterji et al. |
| 6,547,891 | B2 | 4/2003 | Linden et al. |
| 6,561,273 | B2 | 5/2003 | Brothers et al. |
| 6,562,122 | B2 | 5/2003 | Dao et al. |
| 6,565,647 | B1 | 5/2003 | Day et al. |
| 6,572,697 | B2 | 6/2003 | Gleeson et al. |
| 6,610,139 | B2 | 8/2003 | Reddy et al. |
| 6,626,243 | B1 | 9/2003 | Go Boncan |
| 6,645,290 | B1 | 11/2003 | Barbour |
| 6,656,265 | B1 | 12/2003 | Garnier et al. |
| 6,660,080 | B2 | 12/2003 | Reddy et al. |
| 6,666,268 | B2 | 12/2003 | Griffith et al. |
| 6,668,929 | B2 | 12/2003 | Griffith et al. |
| 6,689,208 | B1 | 2/2004 | Brothers |
| 6,702,044 | B2 | 3/2004 | Reddy et al. |
| 6,706,108 | B2 | 3/2004 | Polston |
| 6,708,760 | B1 | 3/2004 | Chatterji et al. |
| 6,716,282 | B2 | 4/2004 | Griffith et al. |
| 6,729,405 | B2 | 5/2004 | DiLullo et al. |
| 6,767,398 | B2 | 7/2004 | Trato |
| 6,776,237 | B2 | 8/2004 | Dao et al. |
| 6,796,378 | B2 | 9/2004 | Reddy et al. |
| 6,797,054 | B2 | 9/2004 | Chatterji et al. |
| 6,823,940 | B2 | 11/2004 | Reddy et al. |
| 6,832,652 | B1 | 12/2004 | Dillenbeck et al. |
| 6,835,243 | B2 | 12/2004 | Brothers et al. |
| 6,837,316 | B2 | 1/2005 | Reddy et al. |
| 6,840,318 | B2 | 1/2005 | Lee |
| 6,846,357 | B2 | 1/2005 | Reddy et al. |
| 6,848,519 | B2 | 2/2005 | Reddy et al. |
| 6,874,578 | B1 | 4/2005 | Garnier |
| 6,883,609 | B2 | 4/2005 | Drochon |
| 6,887,833 | B2 | 5/2005 | Brothers et al. |
| 6,889,767 | B2 | 5/2005 | Reddy et al. |
| 6,904,971 | B2 | 6/2005 | Brothers et al. |
| 6,908,508 | B2 | 6/2005 | Brothers |
| 6,911,078 | B2 | 6/2005 | Barlet-Gouedard et al. |
| 6,964,302 | B2 | 11/2005 | Luke et al. |
| 7,022,755 | B1 | 4/2006 | Chatterji et al. |
| 7,048,053 | B2 | 5/2006 | Santra et al. |
| 7,077,203 | B1 | 7/2006 | Roddy et al. |
| 7,174,962 | B1 | 2/2007 | Roddy et al. |

| | | |
|---|---|---|
| 7,182,137 B2 * | 2/2007 | Fyten et al. .......... 166/292 |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,293,609 B2 | 11/2007 | Dealy |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,350,573 B2 * | 4/2008 | Reddy .......... 166/285 |
| 7,350,576 B2 | 4/2008 | Robertson |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,612,021 B2 | 11/2009 | Chatterji |
| 7,627,870 B1 | 12/2009 | Michaeli et al. |
| 7,631,692 B2 | 12/2009 | Roddy et al. |
| 7,674,332 B2 | 3/2010 | Roddy et al. |
| 7,743,828 B2 | 6/2010 | Roddy et al. |
| 7,748,453 B2 | 7/2010 | Reddy |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,039,253 B2 | 10/2011 | Asou |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,327,939 B2 | 12/2012 | Roddy |
| 8,333,240 B2 | 12/2012 | Roddy |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterj et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0166834 A1 | 7/2006 | Roddy |
| 2006/0175060 A1 * | 8/2006 | Reddy .......... 166/294 |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0089643 A1 | 4/2007 | Roddy et al. |
| 2007/0102157 A1 | 5/2007 | Roddy et al. |
| 2007/0137528 A1 | 6/2007 | LeRoy-Delage et al. |
| 2007/0186820 A1 | 8/2007 | O'Hearn |
| 2007/0289744 A1 | 12/2007 | Bingamon et al. |
| 2008/0092780 A1 | 4/2008 | Bingamon et al. |
| 2008/0156491 A1 | 7/2008 | Roddy et al. |
| 2008/0229979 A1 | 9/2008 | Lewis |
| 2009/0044726 A1 | 2/2009 | Brouillette et al. |
| 2009/0120644 A1 | 5/2009 | Roddy et al. |
| 2009/0124522 A1 | 5/2009 | Roddy et al. |
| 2009/0200029 A1 | 8/2009 | Roddy et al. |
| 2009/0266543 A1 | 10/2009 | Reddy et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0077922 A1 | 4/2010 | Constantz et al. |
| 2010/0122816 A1 | 5/2010 | Lewis |
| 2010/0196104 A1 | 8/2010 | Constantz et al. |
| 2010/0258035 A1 | 10/2010 | Constantz et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2010/0313793 A1 | 12/2010 | Constantz et al. |
| 2011/0000400 A1 | 1/2011 | Roddy |
| 2011/0017452 A1 | 1/2011 | Benkley |
| 2011/0100626 A1 | 5/2011 | Brenneis et al. |
| 2012/0152539 A1 | 6/2012 | Karcher et al. |
| 2012/0267107 A1 | 10/2012 | Benkley et al. |
| 2012/0291674 A1 | 11/2012 | Brenneis et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |
| 2013/0008352 A1 | 1/2013 | Roddy et al. |

FOREIGN PATENT DOCUMENTS

| | | |
|---|---|---|
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 2075303 A1 | 7/2009 |
| GB | 1469954 | 4/1997 |
| GB | 245546 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 9/1982 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO 2007/048999 | 5/2007 |
| WO | WO 2007/128945 | 11/2007 |
| WO | WO 2009/138747 | 11/2009 |

OTHER PUBLICATIONS

Poon, "A Study of the Hydration of Natural Zeolite Blended Cement Pastes", 1999.

"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement and Pozmix 140".
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for PRESSUR-SEAL, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431, (Advisory Action) Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703 (Advisory Action), Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
English language translation of Foreign Office Action for Application No. RU2008113765, Jul. 6, 2009.
Foreign Office Action for Canadian Patent Application No. 2621835, Oct. 2, 2009.
Foreign Office Action for Canadian Patent Application No. 2621832, Oct. 5, 2009.
PCT International Search Report and Written Opinion for International Application No. PCT/GB2009/002598, Feb. 11, 2010.
PCT International Search Report and Written Opinion for International Application No. PCT/GB2009/002597, Feb. 1, 2010.
English language translation of USSR Patent No. RU 2026959, Jan. 20, 1995.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.

Foreign Office Action for EP Application No. 06 779 194.7, Jul. 2, 2010.
Office Action from U.S. Appl. No. 12/588,097, Sep. 3, 2010.
Foreign Office Action for EP Application No. 06 779 199.6, Mar. 1, 2010.
Office Action from U.S. Appl. No. 12/844,612, Oct. 1, 2010.
Foreign Office Action for EP Application No. 06 779 191.3, Mar. 31, 2010.
Foreign Office Action for CN Application No. 200680042004.X, May 12, 2010.
Foreign Office Action for RU Application No. 2008113766, Jul. 14, 2009.
Foreign Office Action for RU Application No. 2008113766, Apr. 8, 2010.
Foreign Office Action for EP Application No. 06 794 646.7, Sep. 24, 2010.
Office Action from U.S. Appl. No. 12/833,189, Oct. 1, 2010.
HES Brochure "Tuned® Spacer V", Aug. 2010.
HES Brochure "Tuned Spacer™ III", Apr. 2007.
HES Brochure "Enhancer 923™"Cement Agent.
HES Brochure "Enhancer 923™ Agent—Successes from the Field", Jun. 2010.
Suyan, "An Innovative Material for Severe Lost Circulation Control in Depleted Formations" SPE/IADC 125693, Oct. 2009.
HES Brochure "Thermatek® RSP Rapid Set Plug Service", Mar. 2008.
HES Brochure "Thermatek Service", May 2005.
Vinson, "Acid Removable Cement System Helps Lost Circulation in Productive Zones", IADC/SPE 23929, Feb. 1992.
Foreign Office Action for EP Application No. 09 713 469.6, Sep. 28, 2010.
PCT International Search Report for International Application No. PCT/GB2009/000295, Jul. 30, 2009.
PCT Written Opinion for International Application No. PCT/GB2009/000295, Jul. 30, 2009.
PCT International Preliminary Report on Patentability for International Application No. PCT/GB2009/000295, Aug. 24, 2010.
Foreign Office Action for Canadian Application No. 2,650,630, Oct. 14, 2010.
Foreign Office Action for Canadian Application No. 2,658,155, Nov. 16, 2010.
The Schundler Company, "Perlite as an Ultra Fine Filler", Schundler Product Guide, http://www.schundler.com/filler.htm, 2010.
Murphy, "A Critique of Filler Cements", Journal of Petroleum Technology, Aug. 1967.
Hall, "Bridging Effectiveness of Perlite for Light Weight Cements and Lost Circulation", Petroleum Branch, AIME, Paper No. 141-G, Oct. 1951.
Saunders, "Trend in Use of Low-weight Cement Slurries", Abstract, Mar. 1952.
HES Brochure, "Perlite Cement Additive", 1999.
HES Brochure, "Cementing—Perlite Cement Additive", Aug. 2007.
English language translation of Foreign Office Action for Chinese Application No. 200680042014.3, Dec. 1, 2010.
Office Action from U.S. Appl. No. 12/364,998, Jan. 14, 2011.
Office Action from U.S. Appl. No. 12/844,612, dated Jan. 28, 2011.

PCT International Search Report and Written Opinion for International Application No. PCT/GB2010/001986 dated Jan. 19, 2011.
PCT International Search Report and Written Opinion for International Application No. PCT/GB2010/002011 dated Feb. 4, 2011.
PCT International Search Report and Written Opinion for International Application No. PCT/GB2011/001411 dated Jan. 27, 2012.
PCT International Preliminary Report on Patentability (Chapter 1) for International Application No. PCT/GB2009/002018 dated Mar. 24, 2011.
U.S. Appl. No. 13/399,913, filed Feb. 17, 2012, Roddy.
U.S. Appl. No. 13/447,560, filed Apr. 16, 2012, Roddy.
U.S. Appl. No. 13/477,777, filed May 22, 2012, Roddy.
U.S. Appl. No. 13/479,476, filed May 24, 2012, Roddy.
Final Office Action from U.S. Appl. No. 12/264,010 dated Apr. 10, 2012.
Office Action from U.S. Appl. No. 12/844,612 dated Apr. 11, 2012.
Office Action from U.S. Appl. No. 13/399,913 dated May 15, 2012.
Office Action from U.S. Appl. No. 13/447,560 dated May 31, 2012.
Office Action from U.S. Appl. No. 12/821,412 dated Jun. 5, 2012.
USPTO Notice of Allowance for U.S. Appl. No. 12/544,915 dated Aug. 1, 2011.
USPTO Office Action for U.S. Appl. No. 12/844,612 dated Sep. 6, 2011.
U.S. Appl. No. 13/180,238, filed Jul. 11, 2011, Karcher.
PCT International Search Report and Written Opinion for International Application No. PCT/GB2011/000933 dated Sep. 22, 2011.
USPTO Office Action for U.S. Appl. No. 12/264,010 dated Oct. 31, 2011.
USPTO Office Action for U.S. Appl. No. 12/844,612 dated Dec. 23, 2011.
Adaska and Taubert, "Beneficial Uses of Cement Kiln Dust", 2008 IEEE/PCA 50th Cement Industry Technical Conference, Miami, FL, May 19-22, 2008, pp. 1-19.
Office Action from U.S. Appl. No. 12/825,004 dated Jun. 14, 2012.
Notice of Allowance from U.S. Appl. No. 13/447,560 dated Jun. 21, 2012.
Office Action from U.S. Appl. No. 13/479,476 dated Jul. 2, 2012.
Final Office Action from U.S. Appl. No. 12/844,612 dated Jul. 30, 2012.
Foreign Office Action for Canadian Application No. 2736148 dated May 29, 2012.
U.S. Appl. No. 13/662,111, filed Oct. 26, 2012.
U.S. Appl. No. 13/669,149, filed Nov. 5, 2012.
USPTO Office Action from U.S. Appl. No. 13/431,701 dated Nov. 9, 2012.
International Search Report and Written Opinion for PCT/US2012/046117 dated Oct. 26, 2012.
USPTO Office Action from U.S. Appl. No. 13/669,149 dated Dec. 19, 2012.
USPTO Office Action from U.S. Appl. No. 13/606,098 dated Dec. 13, 2012.
USPTO Office Action from U.S. Appl. No. 13/620,163 dated Nov. 9, 2012.
USPTO Office Action from U.S. Appl. No. 13/560,406 dated Oct. 17, 2012.

* cited by examiner

SETTABLE COMPOSITIONS COMPRISING UNEXPANDED PERLITE AND METHODS OF CEMENTING IN SUBTERRANEAN FORMATIONS

CROSS-REFERENCE TO RELATED APPLICATIONS

This application is a continuation in part of U.S. patent application Ser. No. 12/821,412, entitled "Methods of Plugging and Abandoning a Well Using Compositions Comprising Cement Kiln Dust and Pumicite", filed on Jun. 23, 2010, which is a continuation in part of U.S. patent application Ser. No. 12/606,381, issued as U.S. Pat. No. 7,743,828, entitled "Methods of Cementing Subterranean Formation Formations Using Cement Kiln Dust in Compositions Having Reduced Portland Cement Content", filed on Oct. 27, 2009, which is a continuation in part of U.S. application Ser. No. 12/420,630, issued as U.S. Pat. No. 7,631,692, entitled "Settable Compositions Comprising a Natural Pozzolan and Associated Methods", filed on Apr. 8, 2009, which is a continuation in part of U.S. patent application Ser. No. 12/349,676, issued as U.S. Pat. No. 7,674,332, entitled "Extended Settable Compositions Comprising Cement Kiln Dust and Associated Methods", filed on Jan. 7, 2009, which is a divisional of U.S. patent application Ser. No. 12/034,886, issued as U.S. Pat. No. 7,478,675, entitled "Extended Settable Compositions Comprising Cement Kiln Dust and Associated Methods, filed on Feb. 21, 2008, which is a continuation in part of U.S. patent application Ser. No. 11/223,669, issued as U.S. Pat. No. 7,445,669, entitled "Settable Compositions Comprising Cement Kiln Dust and Additive(s)", filed Sep. 9, 2005, the entire disclosures of which are incorporated herein by reference.

BACKGROUND

The present invention relates to cementing operations and, more particularly, in certain embodiments, to, methods and compositions that comprise unexpanded perlite with cement kiln dust ("CKD"), pumicite, or a combination thereof.

In cementing methods, such as well construction and remedial cementing, settable compositions are commonly utilized. As used herein, the term "settable composition" refers to a composition(s) that hydraulically sets or otherwise develops in compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a cement sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like.

SUMMARY

The present invention relates to cementing operations and, more particularly, in certain embodiments, to compositions and methods that include unexpanded perlite, CKD, and/or pumicite.

An embodiment of the present invention comprises a method of cementing comprising: placing a settable composition into a well bore, the settable composition comprising unexpanded perlite, cement kiln dust, and water; and allowing the settable composition to set.

Another embodiment of the present invention comprises a method of cementing comprising: placing a settable composition into a well bore, the settable composition comprising ground unexpanded perlite, Portland cement interground with pumicite, and water; and allowing the settable composition to set.

Yet another embodiment of the present invention comprises a settable composition comprising: ground unexpanded perlite; cement kiln dust; and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to methods and compositions that comprise unexpanded perlite with CKD, pumicite, or a combination thereof. There may be several potential advantages to the methods and compositions of the present invention, only some of which may be alluded to herein. One of the many potential advantages of embodiments of the present invention is that the inclusion of the unexpanded perlite in embodiments of the settable composition may increase the compressive strength of the settable composition after setting. Another potential advantage of embodiments of the present invention is that the CKD, unexpanded perlite, pumicite, or a combination thereof may be used to reduce the amount of a higher cost component, such as Portland cement, resulting in a more economical settable composition. Yet another potential advantage of embodiments of the present invention is that reduction of the amount of Portland cement can reduce the carbon footprint of the cementing operation.

Embodiments of the settable compositions of the present invention may comprise unexpanded perlite with CKD, pumicite or a combination thereof. Embodiments of the settable compositions further may comprise water, for example, in an amount sufficient to form a pumpable slurry. In one particular embodiment, the settable composition may comprise a cementitious component that comprises unexpanded perlite and CKD. In another embodiment, the settable composition may comprise a cementitious component that comprises unexpanded perlite, CKD, and pumicite. In yet another embodiment, the settable composition may comprise a cementitious component that comprises unexpanded perlite and pumicite. In yet another embodiment, the settable composition may comprise a cementitious component that comprises unexpanded perlite and pumicite interground with a hydraulic cement. In yet another embodiment, the settable composition may comprise a cementitious component that comprises unexpanded perlite interground with a hydraulic cement. Optionally, the settable compositions described herein may comprise lime. In one particular embodiment, the settable composition comprises a cementitious component that comprises unexpanded perlite, CKD, pumicite, and/or lime. Other optional additives may also be included in embodiments of the settable compositions as desired, including, but not limited to, fly ash, slag cement, metakaolin, shale, zeolite, combinations thereof, and the like. Embodiments of the settable compositions may be foamed and/or extended as desired by those of ordinary skill in the art.

The settable compositions of the present invention should have a density suitable for a particular application as desired by those of ordinary skill in the art, with the benefit of this disclosure. In some embodiments, the settable compositions may have a density in the range of from about 8 pounds per gallon ("ppg") to about 16 ppg. In other embodiments, the settable compositions may be foamed to a density in the range of from about 8 ppg to about 13 ppg.

Embodiments of the settable compositions generally may comprise unexpanded perlite. Perlite is an ore and generally refers to a naturally occurring volcanic, amorphous siliceous rock comprising mostly silicon dioxide and aluminum oxide. A characteristic of perlite is that it may expand to form a cellular, high-porosity particle or hollow sphere containing multi-cellular cores when exposed to high temperatures due to the sudden vaporization of water within the perlite. The expanded perlite may be used as a density-reducing additive for making lightweight settable compositions.

It has recently been discovered the addition of unexpanded perlite to settable compositions comprising CKD and/or pumicite may provide unexpected increases in compressive strengths. In accordance with embodiments of the present invention, the unexpanded perlite may be used to increase the compressive strength of settable compositions comprising CKD and/or pumicite. In addition, unexpanded perlite can increase the compressive strength of settable compositions comprising Portland cement. It is believed that the unexpanded perlite may be particularly suited for use at elevated well bore temperatures in accordance with embodiments of the present invention, such as at temperatures greater than about 80° F., alternatively greater than about 120° F., and alternatively greater than about 140° F.

In one embodiment, unexpanded perlite may be used, among other things, to replace higher cost cementitious components, such as Portland cement, resulting in more economical settable compositions. In addition, substitution of the Portland cement for the unexpanded perlite should result in a settable composition with a reduced carbon footprint.

In present embodiments, the unexpanded perlite can be ground to any size suitable for use in cementing operations. In an embodiment, the unexpanded perlite is ground to a mean particle size of about 1 micron to about 400 microns, alternatively, about 1 micron to about 100 microns and, alternatively, about 1 micron to about 25 microns. The mean particle size corresponds to d50 values as measured by commercially available particle size analyzers such as those manufactured by Malvern Instruments, Worcestershire. United Kingdom. In another embodiment, the unexpanded perlite has a particle size distribution of about 1 micron to about 1,000 microns with a mean particle size of about 1 micron to about 100 microns. The particle size distribution corresponds to the maximum and minimum sizes allowed in the distribution. An example of a suitable ground unexpanded perlite is available from Hess Pumice Products, Inc., Malad City, Id., under the tradename IM-325 with a mesh size of 325.

In one particular embodiment, the unexpanded perlite can be interground with hydraulic cement, such as Portland cement, for example. In another embodiment, the unexpanded perlite can be interground with hydraulic cement and pumicite. In an embodiment, the ground perlite/cement mixture contains hydraulic cement in an amount of about 25% to about 75% by weight of the mixture and unexpanded perlite in an amount of about 25% to about 75% by weight of the mixture. In one embodiment, the hydraulic cement may be a Portland cement classified as ASTM Type V cement. In accordance with embodiments, the hydraulic cement and unexpanded perlite may be combined and ground to any size suitable for use in cementing operations. In another embodiment, the hydraulic cement and unexpanded perlite may be ground prior to combination. In an embodiment, the ground perlite/cement mixture has a mean particle size of about 0.1 microns to about 400 microns, alternatively, about 0.5 microns to about 50 microns, and alternatively, about 0.5 microns to about 10 microns. The mean particle size corresponds to d50 values as measured by commercially available particle size analyzers such as those manufactured by Malvern Instruments, Worcestershire, United Kingdom.

The unexpanded perlite may be included in the settable compositions in an amount sufficient to provide the desired compressive strength, density, cost reduction, and/or reduced carbon footprint. In some embodiments, the unexpanded perlite may be present in the settable compositions of the present invention in an amount in the range of from about 1% to about 75% by weight of cementitious components. Cementitious components include those components or combinations of components of the settable compositions that hydraulically set, or otherwise harden, to develop compressive strength, including, for example, unexpanded perlite, CKD, fly ash, pumicite, slag, lime, shale, and the like. The unexpanded perlite may be present, in certain embodiments, in an amount of about 5%, about 10%, about 15%, about 20%, about 25%, about 30%, about 35%, about 40%, about 45%, about 50%, about 55%, about 60%, about 65%, or about 70%. In one embodiment, the unexpanded perlite may be present in the settable compositions in an amount in the range of from about 5% to about 50% by weight of cementitious components. In another embodiment, the unexpanded perlite may be present in an amount in the range of from about 10% to about 40% by weight of cementitious components. In yet another embodiment, the unexpanded perlite may be present in an amount in the range of from about 20% to about 30% by weight of cementitious components. One of ordinary skill in the art, with the benefit of this disclosure, will recognize the appropriate amount of unexpanded perlite to include for a chosen application.

Embodiments of the settable compositions generally may comprise CKD. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

The CKD generally may exhibit cementitious properties, in that it may set and harden in the presence of water. In accordance with embodiments of the present invention, the CKD may be used, among other things, to replace higher cost cementitious components, such as Portland cement, resulting in more economical settable compositions. In addition; substitution of the Portland cement for the CKD can result in a settable composition with a reduced carbon footprint.

The CKD may be included in the settable compositions in an amount sufficient to provide the desired compressive strength, density, cost reduction, and/or reduced carbon footprint. In some embodiments, the CKD may be present in the settable compositions of the present invention in an amount in the range of from about 1% to about 95% by weight of cementitious components. The CKD may be present, in certain embodiments, in an amount of about 5%, about 10%, about 15%, about 20%, about 25%, about 30%, about 35%, about 40%, about 45%, about 50%, about 55%, about 60%, about 65%, about 70%, about 75%, about 80%, or about 90%. In one embodiment, the CKD may be present in the settable compositions in an amount in the range of from about 5% to about 95% by weight of cementitious components. In another embodiment, the CKD may be present in an amount in the range of from about 50% to about 90% by weight of cementitious components. In yet another embodiment, the CKD may be present in an amount in the range of from about 60% to about 80% by weight of cementitious components. One of ordinary skill in the art, with the benefit of this disclosure, will recognize the appropriate amount of CKD to include for a chosen application.

Embodiments of the settable compositions further may comprise pumicite. Generally, pumicite is a volcanic rock that exhibits cementitious properties, in that it may set and harden in the presence of hydrated lime and water. Hydrated lime may be used in combination with the pumicite, for example, to provide sufficient calcium ions for the pumicite to set. In accordance with embodiments of the present invention, the pumicite may be used, among other things, to replace higher cost cementitious components, such as Portland cement, resulting in more economical settable compositions. As previously mentioned, replacement of the Portland cement should also result in a settable composition with a reduced carbon footprint.

Where present, the pumicite may be included in an amount sufficient to provide the desired compressive strength, density, cost reduction and/or reduced carbon footprint for a particular application. In some embodiments, the pumicite may be present in the settable compositions of the present invention in an amount in the range of from about 1% to about 95% by weight of cementitious components. For example, the pumicite may be present in an amount of about 5%, about 10%, about 15%, about 20%, about 25%, about 30%, about 35%, about 40%, about 45%, about 50%, about 55%, about 60%, about 65%, about 70%, about 75%, about 80%, or about 90%. In one embodiment, the pumicite may be present in the settable compositions of the present invention in an amount in the range of from about 5% to about 95% by weight of cementitious components. In another embodiment, the pumicite may be present in an amount in the range of from about 5% to about 80% by weight of cementitious components. In yet another embodiment, the pumicite may be present in an amount in the range of from about 10% to about 50% by weight of cementitious components. In yet another embodiment, the pumicite may be present in an amount in the range of from about 25% to about 50% by weight of cementitious components. One of ordinary skill in the art, with the benefit of this disclosure, will recognize the appropriate amount of the pumicite to include for a chosen application.

The water that may be used in embodiments of the settable compositions include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% by weight of cementitious components. In some embodiments, the water may be included in an amount in the range of about 40% to about 150% by weight of cementitious components. One of ordinary skill in the art, with the benefit of this disclosure, will recognize the appropriate amount of water to include for a chosen application.

Embodiments of the settable compositions further may comprise lime. In certain embodiments, the lime may be hydrated lime. The lime may be included in embodiments of the settable compositions, for example, to form a hydraulic composition with other components of the settable compositions, such as the pumicite, fly ash, slag, and/or shale. Where present, the lime may be included in the settable compositions in an amount sufficient for a particular application. In some embodiments, the lime may be present in an amount in the range of from about 1% to about 40% by weight of cementitious components. For example, the lime may be present in an amount of about 5%, about 10%, about 15%, about 20%, about 25%, about 30%, or about 35%. In one embodiment, the lime may be present in an amount in the range of from about 5% to about 20% by weight of cementitious components. One of ordinary skill in the art, with the benefit of this disclosure, will recognize the appropriate amount of the lime to include for a chosen application.

It should be understood that use of Portland cement in embodiments of the settable compositions can be reduced or even eliminated to provide, for example, the desired cost savings and/or reduced carbon footprint. Accordingly, embodiments of the settable compositions of the present invention may comprise Portland cement in an amount of 0% to about 75%. For example, the Portland cement may be present in an amount of about 1%, 5%, about 10%, about 15%, about 20%, about 24%, about 25%, about 30%, about 35%, about 40%, about 50%, about 55%, about 60%, about 65%, or about 70%. In an embodiment, the Portland cement may be present in an amount in the range of from about 0% to about 20%. In another embodiment, the Portland cement may be present in an amount in the range of from about 0% to about 10%. In yet another embodiment, the settable compositions may be essentially free of Portland cement. As used herein, the term "essentially free" means less than about 1% by weight of cementitious components. In certain embodiments, the settable composition may contain Portland cement in an amount less than about 0.1% by weight of cementitious components and, alternatively, less than about 0.01% by weight of cementitious components. By way of example, the settable composition, in certain embodiments, may be free of Portland cement, in that the settable composition contains no Portland cement.

The Portland cements include those classified as Classes A, C, G, and H cements according to American Petroleum Institute, API Specification for Materials and Testing for Well Cements, API Specification 10, Fifth Ed., Jul. 1, 1990. In addition, the Portland cements include those classified as ASTM Type I, II, or III.

One example of a suitable hydraulic cement comprises a mixture of Portland cement and pumicite. In an embodiment, the cement/pumicite mixture contains Portland cement in an amount of about 25% to about 75% by weight of the mixture and pumicite in an amount of about 25% to about 75% by weight of the mixture. In an embodiment, the cement/pumicite mixture contains about 40% Portland cement by weight and about 60% pumicite by weight. In an embodiment, the hydraulic cement may comprise Portland cement interground with pumicite. In one embodiment, the Portland cement may be classified as ASTM Type V cement. In accordance with embodiments, the Portland cement, and pumicite may be combined and ground to any size suitable for use in cementing operations. In another embodiment, the Portland cement and pumicite may be ground prior to combination. In an embodiment, the cement/pumicite mixture of Portland cement and pumicite has a mean particle size of about 0.1 microns to about 400 microns, alternatively, about 0.5 microns to about 50 microns, and alternatively, about 0.5 microns to about 10 microns. The mean particle size corresponds to d50 values as measured by commercially available particle size analyzers such as those manufactured by Malvern Instruments, Worcestershire, United Kingdom. An example of a suitable cement/pumicite mixture is available from Halliburton Energy Services, Inc., under the trade name FineCem™ 925 cement.

It is believed that hydraulic cement interground with pumicite when used in a settable composition in combination with unexpanded perlite may provided synergistic effects. For example, it is believed that the combination of unexpanded perlite and the cement/pumicite mixture may provide significantly higher compressive strength, particularly at elevated well bore temperatures. Accordingly, the combination of unexpanded perlite and the cement/pumicite mixture may be particularly suited for use in settable compositions at elevated well bore temperatures, such as at temperatures greater than about 80° F., alternatively greater than about 120° F., and alternatively greater than about 140° F.

Embodiments of the settable compositions further may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it should set to form a hardened mass. Class F fly ash generally does not contain sufficient lime, so an additional source of calcium ions is typically required for the Class F fly ash to form a hydraulic composition. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc.

Where present, the fly ash generally may be included in the settable compositions in an amount sufficient to provide the desired compressive strength, density, and/or cost. In some embodiments, the fly ash may be present in the settable compositions of the present invention in an amount in the range of about 1% to about 75% by weight of cementitious components. In some embodiments, the fly ash may be present in an amount in the range of about 10% to about 60% by weight of cementitious components. One of ordinary skill in the art, with the benefit of this disclosure, will recognize the appropriate amount of the fly ash to include for a chosen application.

Embodiments of the settable compositions further may comprise a slag cement. In some embodiments, a slag cement that may be suitable for use may comprise slag. Slag generally does not contain sufficient basic material, so slag cement further may comprise a base to produce a hydraulic composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of about 1% to about 75% by weight of cementitious components. In some embodiments, the slag cement may be present in an amount in the range of about 5% to about 50% by weight of cementitious components. One of ordinary skill in the art, with the benefit of this disclosure, will recognize the appropriate amount of the slag cement to include for a chosen application.

Embodiments of the settable compositions further may comprise metakaolin. Generally, metakaolin is a white pozzolan that may be prepared by heating kaolin clay, for example, to temperatures in the range of about 600° C. to about 800° C. In some embodiments, the metakaolin may be present in the settable compositions of the present invention in an amount in the range of about 1% to about 75% by weight of cementitious components. In some embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Embodiments of the settable compositions further may comprise shale. Among other things, shale included in the settable compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from DU Energy Services, Inc. Generally, the shale may have any particle size distribution as desired for a particular application. In certain embodiments, the shale may have a particle size distribution in the range of about 37 micrometers to about 4,750 micrometers.

Where present, the shale may be included in the settable compositions of the present invention in an amount sufficient to provide the desired compressive strength, density, and/or cost. In some embodiments, the shale may be present in the settable compositions of the present invention in an amount in the range of about 1% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale to include for a chosen application.

Embodiments of the settable compositions further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669. An example of a suitable source of zeolite is available from the C2C Zeolite Corporation of Calgary, Canada. In some embodiments, the zeolite may be present in the settable compositions of the present invention in an amount in the range of about 1% to about 65% by weight of cementitious components. In certain embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Embodiments of the settable compositions further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylated Harlin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR® 15, HR® 25, HR® 601, SCR™ 100, and SCR™ 500 retarders. Generally, where used, the set retarding additive may be included in the settable compositions of the present invention in an amount sufficient to provide the desired set retardation. In some embodiments, the set retarding additive may be present in the settable compositions of the present invention an amount in the range of about 0.1% to about 5% by weight of cementitious components. One of ordinary skill in the art, with the benefit of this disclosure, will recognize the appropriate amount of the set retarding additive to include for a chosen application.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, elastomers, elastomeric particles, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, embodiments of the settable compositions may be used in a variety of subterranean applications, including primary and remedial cementing. Embodiments of the settable compositions may be introduced into a subterranean formation and allowed to set therein. For example, the settable composition may be placed into a space between a subterranean formation and a conduit located in the subterranean formation. Embodiments of the cement compositions may comprise, for example, water and one or more of unexpanded perlite. CKD, or pumicite.

In primary cementing embodiments, for example, a settable composition may be introduced into a space between a subterranean formation and a conduit (e.g., pipe strings, liners) located in the subterranean formation. The settable composition may be allowed to set to form an annular sheath of hardened cement in the space between the subterranean formation and the conduit. Among other things, the set settable composition may form a barrier, preventing the migration of fluids in the well bore. The set settable composition also may, for example, support the conduit in the well bore.

In remedial cementing embodiments, a settable composition may be used, for example, in squeeze-cementing operations or in the placement of cement plugs. By way of example, the settable composition may be placed in a well bore to plug a void or crack in the formation, in a gravel pack, in the conduit, in the cement sheath, and/or a microannulus between the cement sheath and the conduit.

To facilitate a better understanding of the present invention, the following examples of certain aspects of some embodiments are given. In no way should the following examples be read to limit, or define, the scope of the invention.

EXAMPLE 1

A series of samples were prepared and subjected to 24-hour crush strength tests in accordance with API Specification 10 to analyze force resistance properties of settable compositions that comprise unexpanded perlite. The sample compositions were allowed to cure in a water bath at the temperature indicated in the table below for twenty-four hours. Immediately after removal from the water bath, crush strengths were determined using a Tinius Olsen tester. The results of the crush strength tests are set forth in the table below.

Test Nos. 1-6 were performed on samples with a 14.2 ppg and containing water, Portland class H cement, ground unexpanded perlite, lime, and water, as indicated in the table below. The ground unexpanded perlite was IM-325 from Hess Pumice Products with a particle size of about 325 U.S. Standard Mesh.

Test Nos. 7-8 were performed on samples with a density of 14.2 ppg and containing water, Portland class H cement, pumicite, and lime, as indicated in the table below. The pumicite was about 200 U.S. Standard Mesh in size.

Test Nos. 9-14 were performed on samples with a density of 14.2 ppg and containing water, a ground cement/pumicite mixture (FineCem™ 925 cement), unexpanded perlite, lime, and water, as indicated in the table below. The ground cement/pumicite mixture comprised Portland Type V cement (40% by weight) interground with pumicite (60% by weight). The ground cement/pumicite mixture had a mean particle size in the range of about 1 to about 4 microns. The ground unexpanded perlite was IM-325 from Hess Pumice Products with a particle size of about 325 U.S. Standard Mesh.

In the following table, percent by weight is based on the weight of the Portland cement, cement/pumicite mixture, pumicite, and unexpanded perlite in the sample, and gallons per sack (gal/sk) is based on a 94-pound sack of the Portland cement, cement/pumicite mixture, pumicite, and unexpanded perlite.

TABLE 1

Crush Strength Tests

| Test No. | Water (gal/sk) | Portland Cement (% by wt) | Ground Pumicite/ Cement Mixture (% by wt) | Pumicite (% by wt) | Ground Unexpanded Perlite (% by wt) | Lime (% by wt) | Temp. (° F.) | 24-Hr Crush Strength (psi) |
|---|---|---|---|---|---|---|---|---|
| 1 | 7.44 | 100 | — | — | — | — | 80 | 330 |
| 2 | 7.44 | 100 | — | — | — | — | 140 | 674 |
| 3 | 6.74 | 75 | — | — | 25 | — | 80 | 290 |

TABLE 1-continued

Crush Strength Tests

| Test No. | Water (gal/sk) | Portland Cement (% by wt) | Ground Pumicite/ Cement Mixture (% by wt) | Pumicite (% by wt) | Ground Unexpanded Perlite (% by wt) | Lime (% by wt) | Temp. (° F.) | 24-Hr Crush Strength (psi) |
|---|---|---|---|---|---|---|---|---|
| 4 | 6.74 | 75 | — | — | 25 | — | 140 | 777 |
| 5 | 6.95 | 75 | — | — | 25 | 5 | 80 | 352 |
| 6 | 6.95 | 75 | — | — | 25 | 5 | 140 | 886 |
| 7 | 6.74 | 75 | — | 25 | — | — | 140 | 835 |
| 8 | 6.95 | 75 | — | 25 | — | 5 | 140 | 734 |
| 9 | 6.03 | — | 100 | — | — | — | 80 | 827 |
| 10 | 6.03 | — | 100 | — | — | — | 140 | 1877 |
| 11 | 5.68 | — | 75 | — | 25 | — | 80 | 597 |
| 12 | 5.68 | — | 75 | — | 25 | — | 140 | 2740 |
| 13 | 5.89 | — | 75 | — | 25 | 5 | 80 | 530 |
| 14 | 5.89 | — | 75 | — | 25 | 5 | 140 | 2610 |

Example 1 thus indicates that replacement of at least a portion of the Portland cement with unexpanded perlite may increase the crush strength of the settable compositions. At 140° F., for example, the Test Nos. 2 and 4 with unexpanded perlite had crush strengths of 886 psi and 777 psi as compared to a crush strength of 674 psi for Test No. 1 with 100% Portland cement by weight.

Example 1 further indicates that the ground pumicite/cement mixture in combination with the unexpanded perlite may have synergistic effects on the settable composition, in that this combination may provide increased crush strengths at elevated temperatures. At 140° F., for example, Test Nos. 12 and 14 with the ground pumicite/cement mixture and unexpanded perlite had crush strengths of 2740 psi and 2610 psi. This crush strength is markedly higher than the crush strengths for compositions with 100% Portland cement (674 psi at 140° F.) and compositions with Portland cement and pumicite that were not ground to fine particle sizes (835 psi and 734 psi at 140° F.). This increased compressive strength for combinations of ground pumicite/cement mixture and unexpanded perlite cannot be attributed solely to the addition of expanded perlite as the combination had significantly higher crush strength than seen with addition of unexpanded perlite to Portland cement (777 psi and 886 psi at 140° F.). In addition, this increased compressive strength for combinations of ground pumicite/cement mixture and unexpanded perlite cannot be attributed solely to the addition of expanded perlite as the combination had significantly higher crush strength than seen with the ground pumicite/cement mixture alone (1877 at 140° F.).

EXAMPLE 2

An additional series of sample settable compositions were prepared and tested to analyze the force resistance properties of settable compositions that comprise CKD and unexpanded perlite. The sample compositions were allowed to cure in a water bath at the temperature indicated in the table below for either 24 or 72 hours. Immediately after removal from the water bath, crush strengths were determined using a Tinius Olsen tester. The results of the crush strength tests are set forth in the table below.

Test Nos. 15-28 were performed on samples with a density of 14.2 ppg and containing water, CKD, ground unexpanded perlite, and lime, as indicated in the table below. The samples further contained a cement set retarder (CFR-3™ cement set retarder, Halliburton Energy Services, Inc.) in an amount of about 0.4% by weight. The ground unexpanded perlite was IM-325 from Hess Pumice Products with a particle size of about 325 U.S. Standard Mesh.

In the following table, percent by weight is based on the weight of the CKD and unexpanded perlite in the sample, and gallons per sack (gal/sk) is based on a 94-pound sack of the CKD and unexpanded perlite.

TABLE 2

Crush Strength Tests

| Test No. | Water (gal/sk) | CKD (% by wt) | Ground Unexpanded Perlite (% by wt) | Lime (% by wt) | Temp. (° F.) | Time (Hr) | Crush Strength (psi) |
|---|---|---|---|---|---|---|---|
| 15 | 5.99 | 100 | — | — | 80 | 24 | 21.7 |
| 16 | 5.99 | 100 | — | — | 140 | 24 | 267 |
| 17 | 6.19 | 100 | — | 5 | 80 | 72 | 173 |
| 18 | 6.19 | 100 | — | 5 | 140 | 72 | 457 |
| 19 | 5.65 | 75 | 25 | — | 80 | 24 | 23.8 |
| 20 | 5.65 | 75 | 25 | — | 140 | 24 | 969 |
| 21 | 5.87 | 75 | 25 | 5 | 80 | 24 | 19.6 |
| 22 | 5.87 | 75 | 25 | 5 | 140 | 24 | 1004 |
| 23 | 5.5 | 50 | 50 | 5 | 80 | 72 | 124 |
| 24 | 5.5 | 50 | 50 | 5 | 140 | 72 | 1191 |
| 25 | 5.15 | 25 | 75 | 5 | 80 | 72 | 52 |
| 26 | 5.15 | 25 | 75 | 5 | 140 | 72 | 613 |
| 27 | 4.81 | — | 100 | 5 | 80 | 72 | 14 |
| 28 | 4.81 | — | 100 | 5 | 140 | 72 | 145 |

Example 2 thus indicates that unexpanded perlite may be used to enhance the crush strength of CKD-containing compositions. In addition, this effect is particularly pronounced at increased temperatures. At 140° F., for example, Test No. 22 with 75% CKD and 25% unexpanded perlite had a 72-hour crush strength of 1004 psi as compared to a 72-hour crush strength of 457 psi for Test No. 18 with 100% CKD.

EXAMPLE 3

An additional series of sample settable compositions were prepared and tested to further analyze the force resistance properties of settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test Nos. 29-37 were performed on samples with a density of 14.2 ppg and containing water, CKD, ground unexpanded perlite, and lime, as indicated in the table below. The samples further contained a cement dispersant in an amount of about 0.4% by weight. The ground unexpanded perlite was IM-325 from Hess Pumice Products with a particle size of about 325 U.S. Standard Mesh.

In the following table, percent by weight is based on the weight of the CKD and unexpanded perlite in the sample, and gallons per sack (gal/sk) is based on a 94-pound sack of the CKD and unexpanded perlite.

TABLE 3

| | | Crush Strength Tests | | | | |
|---|---|---|---|---|---|---|
| Test No. | Water (gal/sk) | CKD (% by wt) | Ground Unexpanded Perlite (% by wt) | Lime (% by wt) | Temp. (° F.) | 24-Hr Crush Strength (psi) |
| 29 | 6.19 | 100 | — | 5 | 140 | 278 |
| 30 | 5.48 | 90 | 10 | — | 140 | 649 |
| 31 | 6.05 | 90 | 10 | 5 | 140 | 533 |
| 32 | 5.7 | 80 | 20 | — | 140 | 934 |
| 33 | 5.92 | 80 | 20 | 5 | 140 | 958 |
| 34 | 5.42 | 60 | 40 | — | 140 | 986 |
| 35 | 5.64 | 60 | 40 | 5 | 140 | 1241 |
| 36 | 5.28 | 50 | 50 | — | 140 | 897 |
| 37 | 5.5 | 50 | 50 | 5 | 140 | 1197 |

Example 3 thus indicates that unexpanded perlite may be used to enhance the crush strength of CKD-containing compositions. For example, as indicated in the table above, the crush strength of the samples steadily increased as the concentration of unexpanded perlite in the sample was increased from 0% by weight to 40% by weight.

EXAMPLE 4

An additional series of sample settable compositions were prepared and tested to further analyze the force resistance properties of settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test Nos. 38-43 were performed on samples with a density of 14.2 ppg and containing water, CKD, perlite, and lime, as indicated in the table below. The samples further contained a cement dispersant in an amount of about 0.4% by weight. Test Nos. 38 and 39 contained a ground unexpanded perlite (IM-325) from Hess Pumice Products with a particle size of about 325 U.S. Standard Mesh. Test Nos. 40 and 41 contained unground perlite ore having a mean particle size (d50) of about 190 microns. Test Nos. 42 and 43 contained expanded perlite.

In the following table, percent by weight is based on the weight of the CKD and perlite in the sample, and gallons per sack (gal/sk) is based on a 94-pound sack of the CKD and perlite.

TABLE 4

| | | | Crush Strength Tests | | | | | |
|---|---|---|---|---|---|---|---|---|
| Test No. | Water (gal/sk) | CKD (% by wt) | Ground Unexpanded Perlite (% by wt) | Perlite Ore (% by wt) | Expanded Perlite (% by wt) | Lime (% by wt) | Temp. (° F.) | 24-Hr Crush Strength (psi) |
| 38 | 5.65 | 75 | 25 | — | — | — | 140 | 969 |
| 39 | 5.87 | 75 | 25 | — | — | 5 | 140 | 1004 |
| 40 | 5.63 | 75 | — | 25 | — | — | 140 | 199 |
| 41 | 5.85 | 75 | — | 25 | — | 5 | 140 | 204 |
| 42 | 1.07 | 75 | — | — | 25 | — | 140 | Not mixable |
| 43 | 1.29 | 75 | — | — | 25 | 5 | 140 | Not mixable |

Example 4 thus indicates that unexpanded perlite provides superior strength enhancement to CKD-containing compositions when compared to unground perlite ore and expanded perlite. Indeed, the sample with the expanded perlite could not even be tested due to mixability problems.

EXAMPLE 5

An additional series of sample settable compositions were prepared and tested to further analyze settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below. The thickening time for each sample was also determined at 140° F. in accordance with API Specification 10.

Test Nos. 44-56 were performed on samples with a density of 12.5 ppg and containing CKD, perlite, and lime, as indicated in the table below. The samples further contained a cement dispersant in an amount of about 0.4% by weight and a cement set retarder (HR® 5 cement retarder, Halliburton Energy Services, Inc.). Test Nos. 45, 48, 51, and 54 contained a ground unexpanded perlite (IM-325) from Hess Pumice Products with a particle size of about 314 U.S. Standard Mesh. Test Nos. 46, 49, 52, and 55 contained unground perlite ore having a mean particle size (d50) of about 190. Test Nos. 47, 50, 53, and 56 contained expanded perlite.

In the following table, percent by weight is based on the weight of the CKD and perlite in the sample, and gallons per sack (gal/sk) is based on a 94-pound sack of the CKD and perlite.

similar manner to the preceding example, the samples with expanded perlite could not even be tested due to mixability problems.

EXAMPLE 6

An additional series of sample settable compositions were prepared and tested to further analyze settable compositions that comprise CKD and unexpanded perlite. The sample compositions were allowed to cure in a water bath at the temperature indicated in the table below for 24 hours. Immediately after removal from the water bath, crush strengths were determined using a Tinius Olsen tester. The results of the crush strength tests are set forth in the table below.

Test No. 57 was performed on a sample with a density of 12.5 ppg and containing water, Portland Type V cement, CKD, unground perlite ore, and pumicite, as indicated in the table below. The unground perlite ore had a mean particle size (d50) of about 190. The pumicite had a mean particle size (d50) of about 4 microns.

Test No. 58 was performed on a sample with a density of 12.5 ppg and containing water, ground cement/pumicite mixture pumicite, CKD, and ground unexpanded perlite. The ground cement/pumicite mixture comprised Portland Type V cement (40% by weight) interground with pumicite (60% by weight). The ground cement/pumicite mixture had a mean particle size of about 1-4 microns. The ground unexpanded perlite was IM-325 from Hess Pumice Products with a particle size of about 325 U.S. Standard Mesh.

In the following table, percent by weight is based on the weight of the CKD, cement, perlite, pumicite, and/or pumic-

TABLE 5

Crush Strength and Thickening Time Tests

| Test No. | Water (gal/sk) | CKD (% by wt) | Ground Unexpanded Perlite (% by wt) | Perlite Ore (% by wt) | Expanded Perlite (% by wt) | Lime (% by wt) | Set Retarder (% by wt) | Temp. (° F.) | Thick. Time to 70 Bc (psi) | 24-Hr Crush Strength (psi) |
|---|---|---|---|---|---|---|---|---|---|---|
| 44 | 10.51 | 100 | — | — | — | 5 | 0.3 | 140 | 4:06 | 126 |
| 45 | 10.34 | 90 | 10 | — | — | 5 | 0.3 | 140 | 4:17 | 178.2 |
| 46 | 10.36 | 90 | — | 10 | — | 5 | 0.3 | 140 | 5:16 | 119 |
| 47 |  | 90 | — | — | 10 | 5 | 0.6 | 140 | Mixable not pumpable | |
| 48 | 10.18 | 80 | 20 | — | — | 5 | 0.3 | 140 | 4:20 | 311 |
| 49 | 10.18 | 80 | — | 20 | — | 5 | 0.3 | 140 | 5:49 | 100 |
| 50 |  | 80 | — | — | 20 | 5 | 0.3 | 140 | Not mixable | |
| 51 | 9.84 | 60 | 40 | — | — | 5 | 0.3 | 140 | 5:05 | 508 |
| 52 |  | 60 | — | 40 | — | 5 | 0.15 | 140 | 9:44 | 88 |
| 53 |  | 60 | — | — | 40 | 5 | 0.3 | 140 | Not mixable | |
| 54 | 9.67 | 50 | 50 | — | — | 5 | 0.3 | 140 | 8:04 | 616 |
| 55 |  | 50 | — | 50 | — | 5 | 0 | 140 | 23:30 | 78 |
| 56 |  | 50 | — | — | 50 | 5 | 0.3 | 140 | Not mixable | |

Example 5 thus indicates that unexpanded perlite provides enhanced strength to CKD-containing compositions when compared to unground perlite ore and expanded perlite. In a ite/cement mixture in the sample, and gallons per sack (gal/sk) is based on a 94-pound sack of the CKD, cement, perlite, pumicite, and/or pumicite/cement mixture in the sample.

TABLE 6

Crush Strength Tests

| Test No. | Water (gal/sk) | Portland Type V Cement (% by wt) | Pumicite (% by wt) | Ground Pumicite Cement Mixture (% by wt) | CKD (% by wt) | Ground Unexpanded Perlite (% by wt) | Perlite Ore (% by wt) | Temp. (° F.) | 24-Hr Crush Strength (psi) |
|---|---|---|---|---|---|---|---|---|---|
| 57 | 9.52 | 20 | 30 | — | 25 | — | 25 | 140 | 201 |
| 58 | 9.72 | — | — | 50 | 25 | 25 | — | 140 | 1086 |

Example 6 thus indicates that unexpanded perlite in combination with ground pumicite provides enhanced strength to CKD-containing compositions in comparison to compositions with standard cement, pumicite, and unground perlite ore.

It should be understood that the compositions and methods are described in terms of "comprising", "containing", or "including" various components or steps, the compositions and methods can also "consist essentially of" or "consist of" the various components and steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b", or, equivalently, "from approximately a to b", or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A method of cementing comprising:
   placing a settable composition into a well bore, the settable composition comprising unexpanded perlite, cement kiln dust, pumicite, and water; and
   allowing the settable composition to set.

2. The method of claim 1 wherein the settable composition has a density of about 8 pounds per gallon to about 16 pounds per gallon.

3. The method of claim 1 wherein the unexpanded perlite is ground to a mean particle size of about 1 micron to about 400 microns.

4. The method of claim 1 wherein the unexpanded perlite is ground to a mean particle size of about 1 microns to about 100 microns.

5. The method of claim 1 wherein the unexpanded perlite is present in an amount of about 1% to about 75% by weight of cementitious components in the settable composition.

6. The method of claim 1 wherein the cement kiln dust is present in an amount of about 1% to about 95% by weight of cementitious components in the settable composition.

7. The method of claim 1 wherein the water comprises at least one water selected from the group consisting of freshwater, saltwater, brine, seawater, and any combination thereof.

8. The method of claim 1 wherein the water is present in an amount of about 40% to about 200% by weight of cementitious components.

9. The method of claim 1 wherein settable composition further comprises a cement and pumicite mixture comprising pumicite interground with Portland cement.

10. The method of claim 9 wherein the cement and pumicite mixture has a mean particle size of about 0.5 microns to about 10 microns.

11. The method of claim 1 wherein the settable composition further comprises lime.

12. The method of claim 1 wherein the settable composition further comprises at least one additive selected from the group consisting of fly ash, slag cement, metakaolin, shale, zeolite, crystalline silica, amorphous silica, fumed silica, salt, fiber, hydratable clay, microsphere, rice husk ash, elastomer, elastomeric particle, resin, latex, and any combination thereof.

13. The method of claim 1 wherein the settable composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

14. The method of claim 1 wherein the settable composition is allowed to set in the well bore at a temperature of greater than about 120° F.

15. The method of claim 1 wherein the settable composition is allowed to set in the well bore in an annulus between a subterranean formation and a conduit in the well bore.

16. The method of claim 1 further comprising squeezing the settable composition in an opening, the opening comprising at least one opening selected from the group consisting of an opening in a subterranean formation, an opening in a gravel pack, an opening in a conduit, and a microannulus between a cement sheath and a conduit.

17. A method of cementing comprising:
   placing a settable composition into a well bore, the settable composition comprising:
      unexpanded perlite in an amount of about 20% to about 50% by weight of cementitious components, wherein unexpanded perlite is ground to a mean particle size of about 1 micron to about 100 microns,
      cement kiln dust in an amount of about 50% to about 80% by weight of the cementitious components,
      lime in an amount of about 1% to about 10% by weight of the cementitious components, and water; and
   allowing the settable composition to set.

18. The method of claim 17 wherein the settable composition has a density of about 8 pounds per gallon to about 16 pounds per gallon, and wherein the water is present in an amount of about 40% to about 200% by weight of cementitious components.

19. The method of claim 17 wherein settable composition further comprises a cement and pumicite mixture comprising pumicite interground with Portland cement.

20. The method of claim 19 wherein the cement and pumicite mixture has a mean particle size of about 0.5 microns to about 10 microns.

21. The method of claim 17 wherein the settable composition further comprises at least one additive selected from the group consisting of fly ash, slag cement, metakaolin, shale, zeolite, crystalline silica, amorphous silica, fumed silica, salt, fiber, hydratable clay, microsphere, rice husk ash, elastomer, elastomeric particle, resin, latex, and any combination thereof.

22. The method of claim 17 wherein the settable composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

23. The method of claim 17 wherein the settable composition is allowed to set in the well bore in an annulus between a subterranean formation and a conduit in the well bore.

24. The method of claim 17 further comprising squeezing the settable composition in an opening, the opening comprising at least one opening selected from the group consisting of an opening in a subterranean formation, an opening in a gravel pack, an opening in a conduit, and a microannulus between a cement sheath and a conduit.

25. A method of cementing comprising:
placing a settable composition, the settable composition comprising:
ground and unexpanded perlite in an amount sufficient to increase compressive strength of the settable composition,
cement kiln dust,
a cement and pumicite mixture comprising pumicite interground with cement,
water; and
allowing the settable composition to set.

26. The method of claim 25 wherein the settable composition has a density of about 8 pounds per gallon to about 16 pounds per gallon, and wherein the water is present in an amount of about 40% to about 200% by weight of cementitious components.

27. The method of claim 25 wherein the ground and unexpanded perlite is ground to a mean particle size of about 1 micron to about 400 microns.

28. The method of claim 25 wherein the ground and unexpanded perlite is ground to a mean particle size of about 1 microns to about 100 microns.

29. The method of claim 25 wherein the ground and unexpanded perlite is present in an amount of about 1% to about 75% by weight of cementitious components in the settable composition, and wherein the cement kiln dust is present in an amount of about 1% to about 95% by weight of the cementitious components in the settable composition.

30. The method of claim 25 wherein the cement and pumicite mixture has a mean particle size of about 0.5 microns to about 10 microns.

31. The method of claim 25 wherein the settable composition further comprises lime.

32. The method of claim 25 wherein the settable composition further comprises at least one additive selected from the group consisting of fly ash, slag cement, metakaolin, shale, zeolite, crystalline silica, amorphous silica, fumed silica, salt, fiber, hydratable clay, microsphere, rice husk ash, elastomer, elastomeric particle, resin, latex, and any combination thereof.

33. The method of claim 25 wherein the settable composition further comprises at least one additive selected from the group consisting of a set retarding additive, a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

34. The method of claim 25 wherein the settable composition is placed into a well bore.

35. The method of claim 25, wherein the settable composition is placed into a well bore, and allowed to set in the well bore in an annulus between a subterranean formation and a conduit in the well bore.

* * * * *